Aug. 11, 1953     E. G. JOHNSON     2,648,832
TIME SYSTEM
Filed Sept. 3, 1946     9 Sheets-Sheet 1
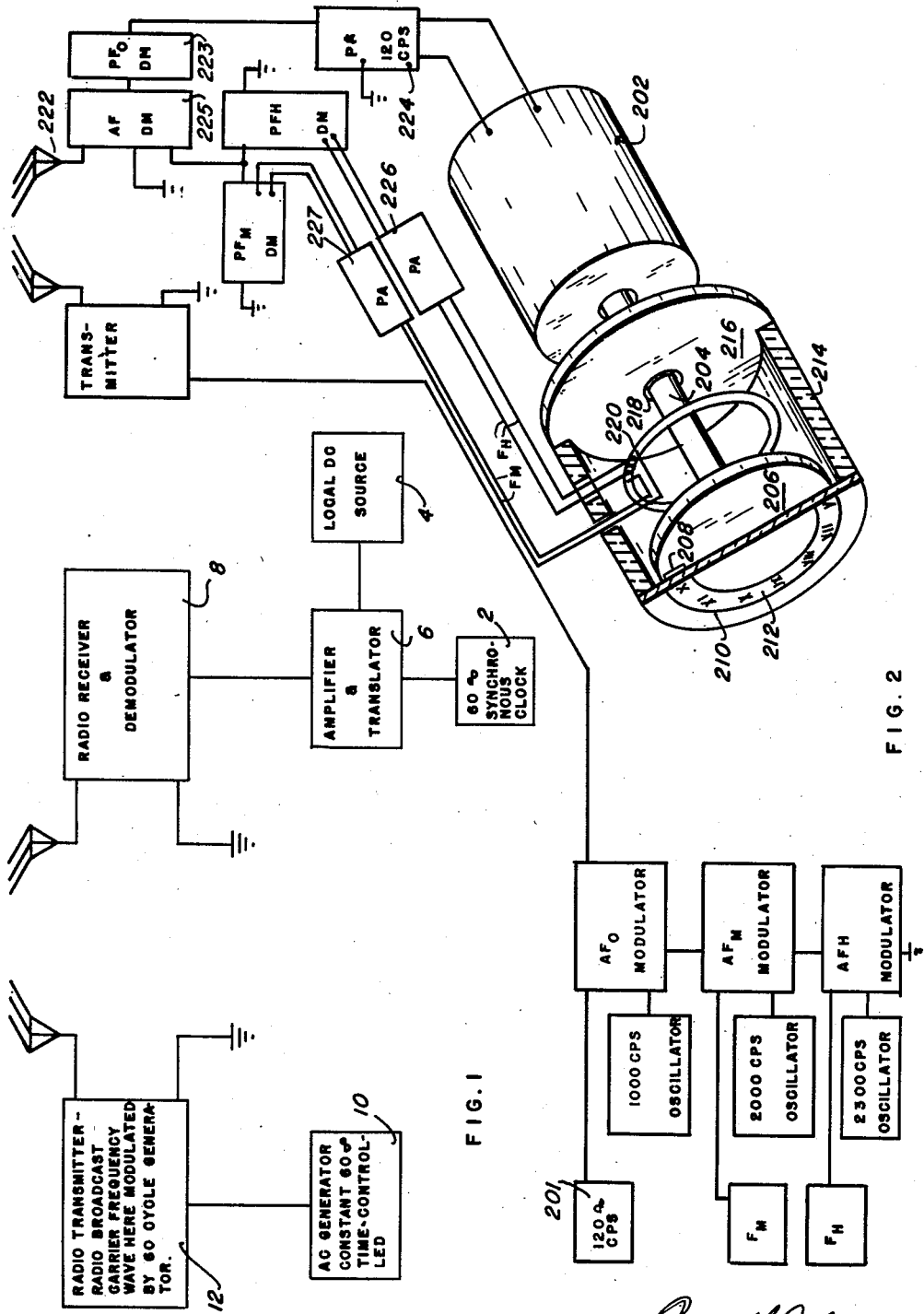
Erwin G. Johnson
INVENTOR

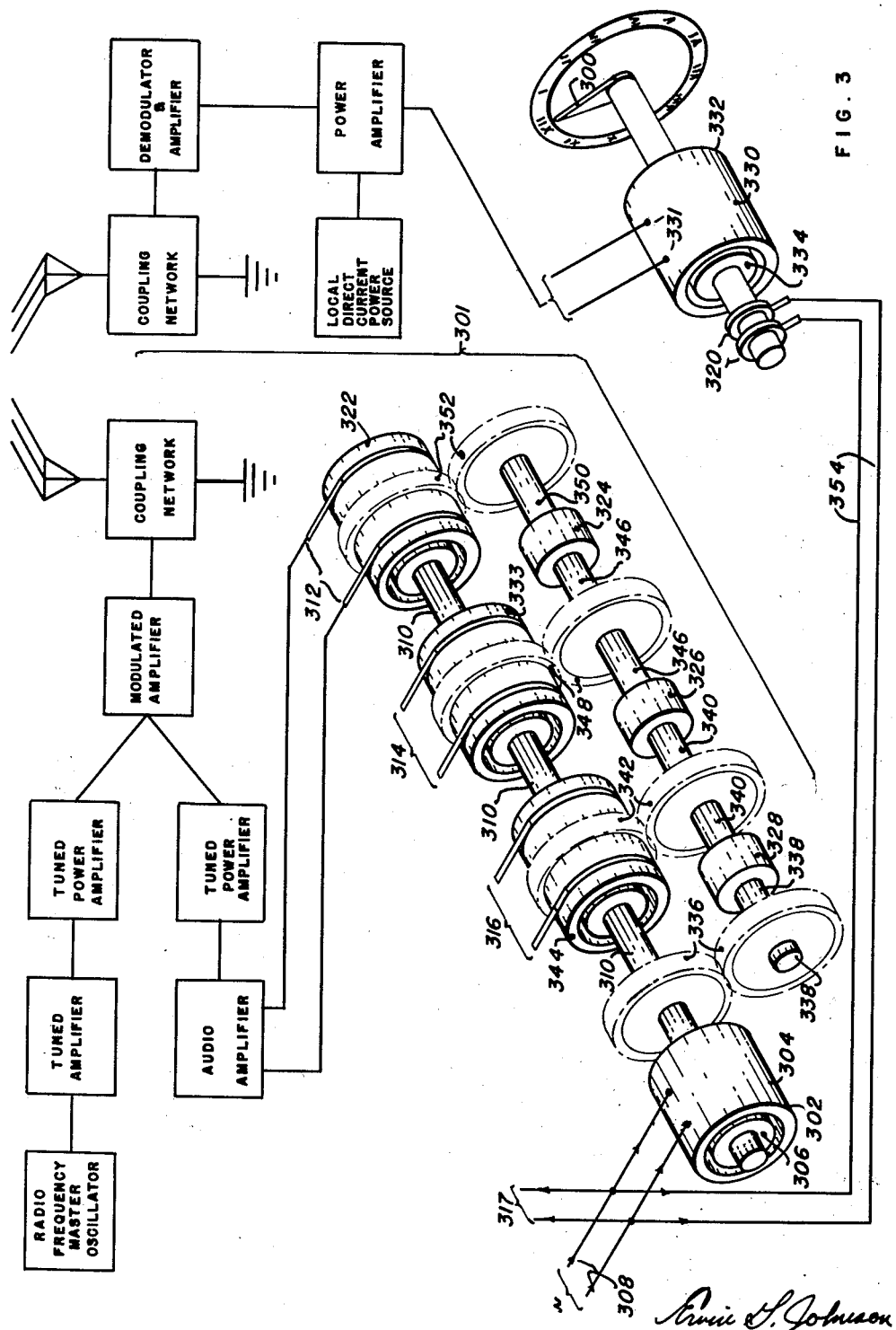

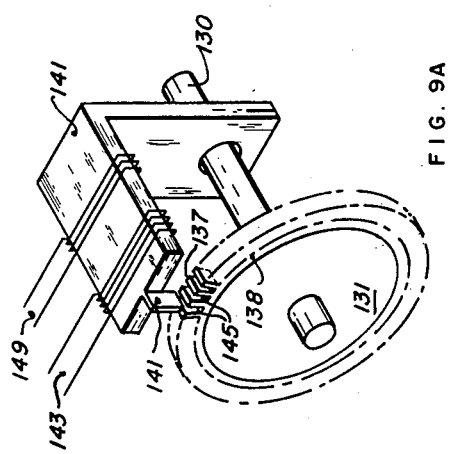
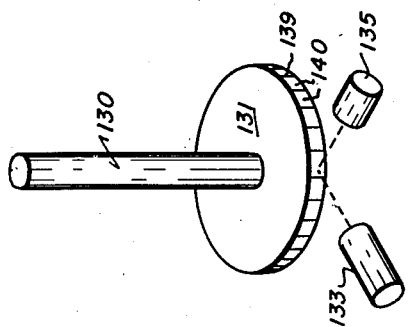
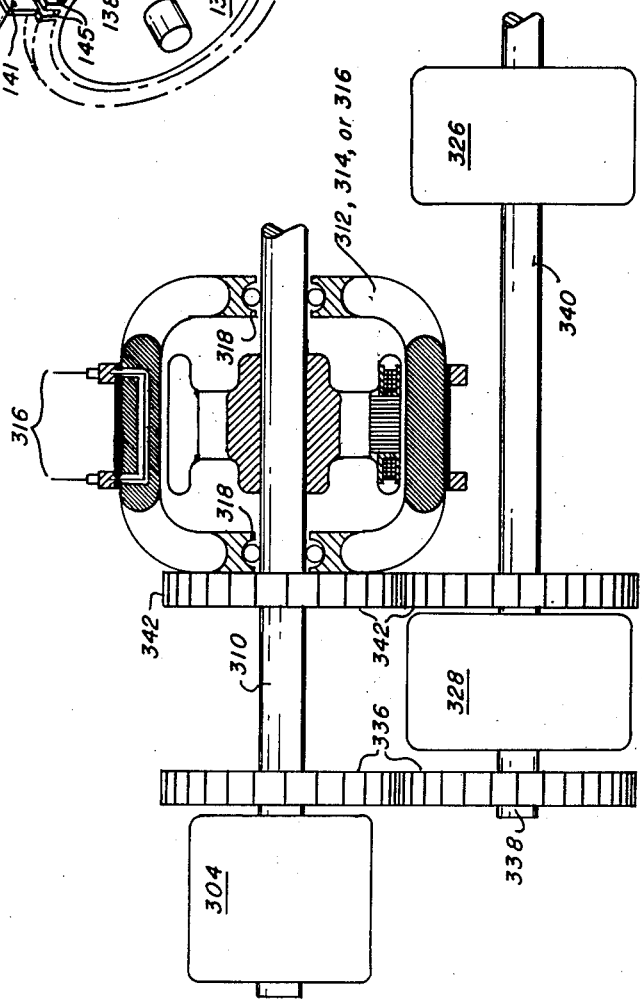

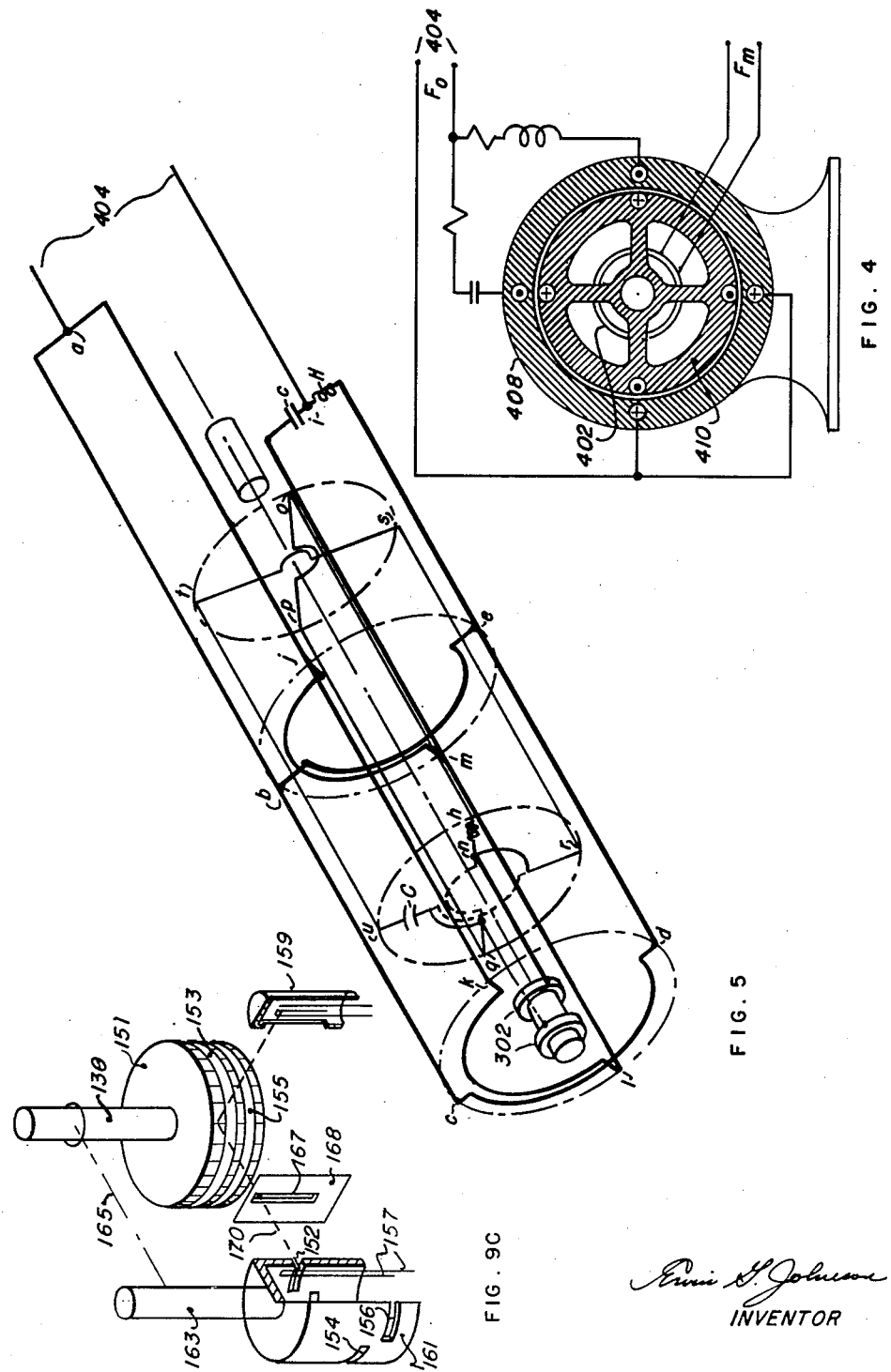

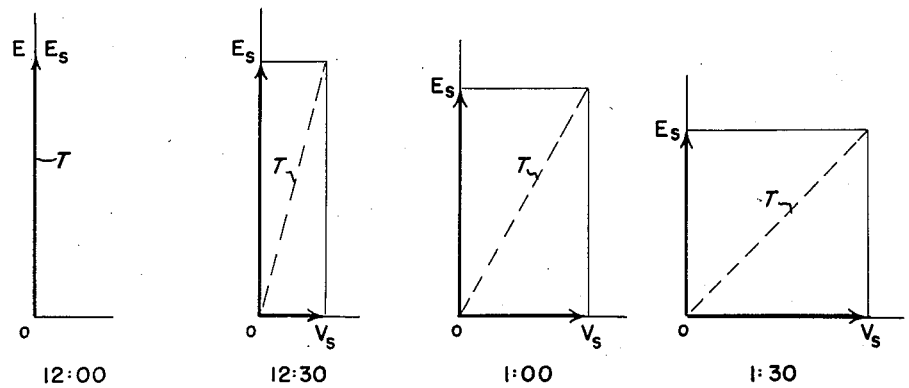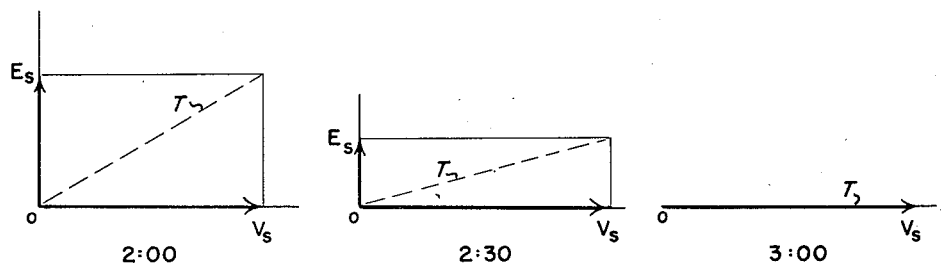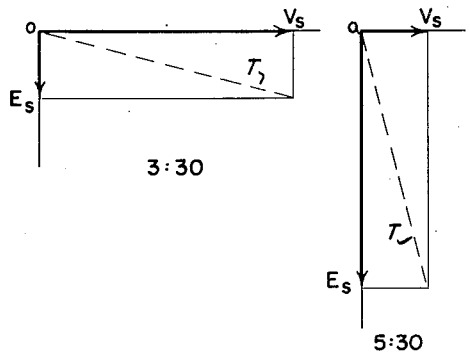
FIG. 7A

Aug. 11, 1953  E. G. JOHNSON  2,648,832
TIME SYSTEM
Filed Sept. 3, 1946  9 Sheets-Sheet 8
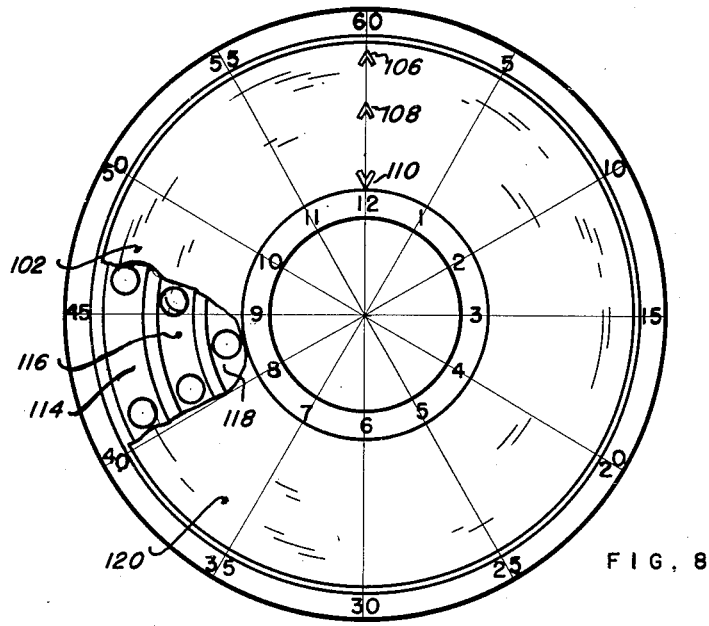
FIG. 8
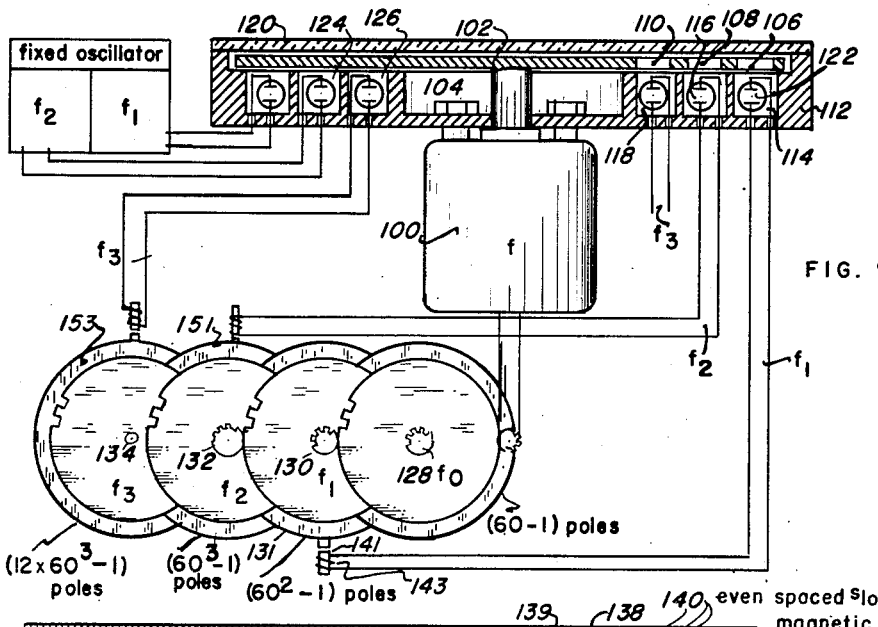
FIG. 9
FIG. 10
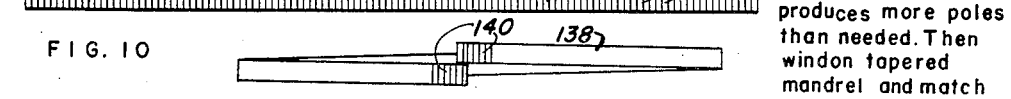
FIG. 11
even spaced slots in steel magnetic ribbon produces more poles than needed. Then wind on tapered mandrel and match first and total plus one poles and fasten.
*Emi S. Johnson*
INVENTOR Patented Aug. 11, 1953

2,648,832

UNITED STATES PATENT OFFICE 2,648,832

TIME SYSTEM

Ervin G. Johnson, Eureka, Calif.

Application September 3, 1946, Serial No. 694,622

13 Claims. (Cl. 340—177)

This invention relates to a time system, and especially to a time system the indicating media of which are controlled from a central point whereat the controlling means is continuously kept in step with standard time. Systems of this character are generally illustrated by the contemporary synchronous motor electric clock operating in conjunction with time-standardized alternating current public utility power distribution systems so that accurate time indication is provided by the clock as an incident of the distribution of electrical power by alternating current; in this way, all clocks so operated from one isolated power system remain, generally, in step with the generators supplying the power, which generators act as the controlling means synchronized with standard time.

This application is a continuation in part of my copending application Serial No. 357,331 filed September 18, 1940.

The objects of this invention include:

Providing a time system which includes the specific advantage that the indicating media, which media corresponds to the synchronous motor operated clock in the contemporary system, may be kept in operation to continuously indicate the correct time, even though the public utility electrical power system supplying the point of indication with alternating power ceases to supply such power;

Providing a time system which includes the specific advantage that the electrical power distribution system of the alternating current type involved in the presently known system is unessential to the accurate indication of time; so that an accurate indication of time which is controlled from a central point, establishing standard time continuously, may be utilized at remote points such as on aircraft, watercraft, in isolated communities or in other places where no large amounts of electrical power are available;

Providing a time system which includes the specific advantage that the indication of time thereby need not be continuous; so that one may learn the correct standard time from the indicating medium immediately upon placing it in operation; so that it is not necessary to keep the medium in operation in order to learn the correct time when the correct time is wanted; so that the central control point may be placed in operation, taken out of operation, and operation reestablished, without interfering with the proper indication of time at the point of use when the central control point is placed in operation;

Providing a time system which is adaptable to use various styles of time indicating media, depending on the character of the use, so that the system may be more universally used;

Providing a time system employing remote control features such that the datum of zero time at the indicating media is correctly and continuously indicated;

Providing a time system employing remote control features such that the datum of time is continuously transmitted from the central control point;

Providing a time signal transmission system, a method for continuously indicating the relative positions of two members, as the hour and the minute hand of a clock, or the hour hand and the zero datum of time, at a point remote from a central control point;

Providing in a time system for the generation of a plurality of alternating current waves bearing continuously exact frequency ratios, and for the generation of frequencies which differ from each other by extremely small fractions of a percent;

Providing in a time system, for the generation of a plurality of alternating current waves of different frequencies, which frequencies differ by extremely small percentages, and the timing of the waves of which varies periodically such that in a unit of time the maximum amplitude will coincide an integral number of times;

Providing, in a time system, for the generation of a plurality of alternating current waves the maximum amplitudes of each succeeding wave of which varies from that of the preceding wave according to a definite function; for example, a transcendental or sine function; that is, the wave has two amplitude periodicities as to time; one periodicity corresponding to ordinary power distribution frequencies and another expressible in small numbers of cycles per unit of standard time, such as one cycle per day;

Providing, in a time system, for the generation and/or propagation of an alternating current wave the maximum amplitude of which has a period expressed as a large fraction of a unit of time;

Providing, in a time system, for the generation and/or propagation of alternating current waves so controlled as to time that their effects at a remote point are to control means to indicate time;

Providing, in a time system, for the separate generation of periodic waves, their transmission separately to a point of use, and their joint utilization thereat to indicate time;

Providing, in a time system, for the separate generation of periodical waves, such and so related in period, phase, shape, and amplitude, that their joint action is uniform;

Providing, in a time system, an apparatus and method for indicating the phase relationship between two alternating currents;

Providing, in a time system, a method whereby all the elements determining an indication of correct time are expressed in a signal emanating from a central point;

Providing in a time system, a method whereby time may be indicated through the agency of carrier currents;

Providing in a time system, a method whereby time may be indicated through the agency of electromagnetic waves of a radio broadcasting system;

Providing in a time system, a method whereby time may be indicated through the agency of a wire communication system;

Providing, in a time system, a method of operating an electron tube so that time is indicated on its screen;

Providing, in a time system, a method of operating an electrical motor such that it rotates once per unit of time, such as once per day;

Providing, in a time system, a method of generating waves of electromagnetic energy in such a manner that a single rotating member suffices to indicate time at the point of use;

Providing, in a time system, a method whereby an indicating member may be caused to rotate at a uniform angular velocity having a period equal to a period of time indicated thereby;

Providing, in a time system, a method and apparatus whereby a single indicating agency may be caused to indicate simultaneously, time with several degrees of precision, such as, hours and minutes;

Providing, in a time system, a method and apparatus whereby the indicating media involves a minimum of moving parts; to wit, no moving parts, or but one moving part, or one moving part only for each unit of time indicated, or a number of parts substantially less than employed by such systems heretofore in use;

Providing, in a signal system, including a time indicating system, a method whereby the difference in frequency of two sine waves may be represented by their combined effects upon other agencies such as a cathode ray tube, such combined effect providing in the screen of such tube a trace the position of which at any instant represents the phase relation between corresponding points of the respective waves and the rate of movement of which trace represents the periodicity of the beats resulting from the combination of the two frequencies;

Providing, in a signal system, including a time indicating system, for the transmission of synchronising control via conventional radio broadcast channels in such a manner that a minimum range of wavelengths is occupied;

Providing, in a signal system, including a time indicating system, methods and means for combining relatively high-frequency waves to produce relatively low frequency waves of uniform amplitude;

Providing, in a signal system, including a time indicating system, methods and means for combining relatively high-frequency waves to produce waves which are doubly periodic; that is, so that the produced waves have a first periodicity of amplitude which is close to the period of the high-frequency waves, and a second periodicity of amplitude which is a large multiple of the first periodicity;

Providing, in a signal system, including a time indicating system, for the generation of a plurality of plural-phase independent electrical energies of frequencies differing by extremely low percentages, such that for certain practical purposes the frequencies are practically identical and for other concurrently practical purposes the frequencies are unlike, and for this reason the energies produce practical effects jointly of which they are individually incapable;

Providing, in a time system, for the concurrent transmission on a single radio frequency channel, of a plurality of low frequency waves, in such a manner that the various waves may be effectively separated and used in substantially their original form at a point of reception and use;

Providing, in a time system, for the concurrent generation of conventional power frequencies, and frequencies differing therefrom by small numbers of cycles per unit of time;

Providing, in a time system, for the rotation of an indicating member once per unit of time by a motor which, itself, is designed and arranged to rotate exactly once per unit of time, in response to the application thereto of electrical energies of conventional power frequencies;

Providing, in a time system, for the indication of time by a single rotating member and a single gaseous illuminating tube; and Other objects and advantages as will appear in the following specification, wherein reference is made to the accompanying drawings, in which:

Fig. 1 is a diagram illustrating one embodiment of my invention in its most elementary form;

Fig. 2 is a diagram of another embodiment of my invention;

Fig. 3 is a diagram of a further embodiment of my invention;

Fig. 3A is a fragmentary plan view of a portion of the mechanism of Fig. 3;

Fig. 4 is a section through an electric motor employed in one of the embodiments of the time indicating unit;

Fig. 5 is a wiring diagram for the motor of Fig. 4;

Fig. 7A is a series of diagrams to illustrate the effects of combining voltages produced in Fig. 6 apparatus and the effect on the beam of a cathode ray tube;

Fig. 8 is a front view of a time indicating device according to another embodiment of my invention;

Fig. 9 is a combination apparatus, wiring, and schematic diagram of the embodiment comprising the device of Fig. 8;

Fig. 10 illustrates a step in a detail of producing a required part;

Figure 12:
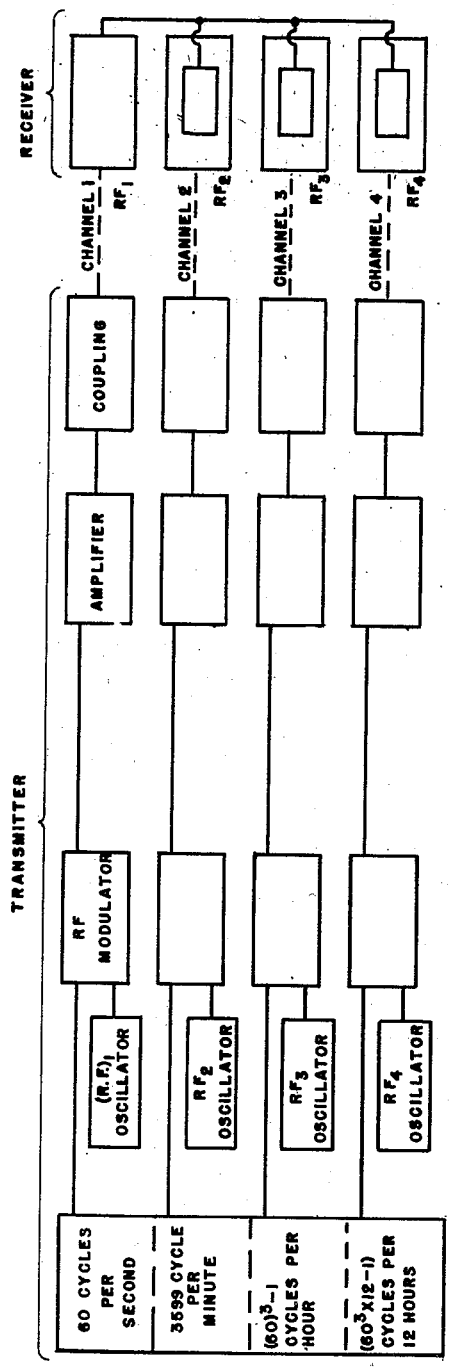

Figs. 9A, 9B, and 9C illustrate different embodiments of devices for producing desired frequencies;

Fig. 11 illustrates a step in extension of the step in Fig. 10;

Fig. 12 is a block diagram illustrating a transmission system; and

Figure 13:
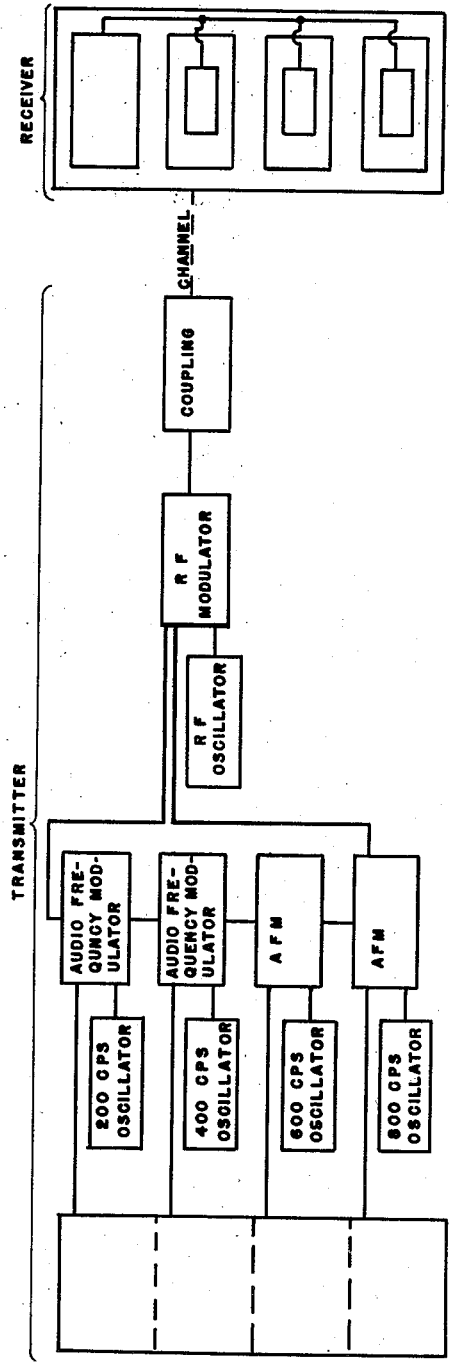

Fig. 13 is a block diagram illustrating another system of transmission.

Several embodiments of the broad phases of the invention are illustrated by the drawings and described in the specification following. Attempt is made to describe each preliminarily in a brief manner, and certain embodiments will be more particularly described where their complication requires more particularity.

In general, the purpose of the invention is to indicate standard time at a distant point with respect to a central point, in such manner that the accuracy is controlled from a central point entirely. It will be clear to those familiar with the art of television for example, that this end might be accomplished by telecasting the image of a chronometer's face so that it is displayed on the screen of a television receiver, and its disposition may be arranged so that it occupies but a small portion of the screen, the balance of the screen being devoted to other images. In this way, the accurate indication of time may be as widespread as the number of television receivers.

The following descriptions related, however, to more universally applicable methods and systems from the point of view of simplicity of the utilizing apparatus, which, while varying in the amount of technical detail at the receiving end does not involve, in any case, the degree of complication of the television receiver.

A simple system of radiocasting time signals is illustrated in Fig. 1. It adopts and utilizes the conventional synchronous clock which by the system heretofore in use is energized, and controlled, by the power distribution system of utility systems operating on alternating current. The principal advantages of the system of Fig. 1 includes improvement in the continuity of time indication accuracy and a geographically more universal spread of the effectiveness of the system. Continuity of time indication accuracy, with power systems, is oftentimes broken, and is not necessarily reestablished by the reestablishment of the power supply. If a short circuit on the power system occurs, the synchronous motor clocks operated thereby stop, and the number of rotations of the clock motor lost while the power is off is directly proportional to the time interval of the outage. The measure of this time interval is unknown to the user of the clock, and although he is put on notice of the fact of an outage by a signal embodied in the clock, the correct time for restarting and setting the clock correctly can only be ascertained by means other than the clock the power supply of which has been interrupted.

Time indications are available from power systems employing alternating current distributed to the consumer and controlled accurately in accordance with standard time. Direct current systems, and local alternating current electrical power plants not equipped for preventing frequency drifts of their power distribution frequencies, are incapable of operating time systems in accordance with standard time in the usual manner.

By one described embodiment of this invention, as illustrated by Fig. 1, the conventional synchronous motor operated clock 2 receives alternating current at conventional power frequency. The power supply 4 for the clock, and other apparatus, may be a local direct current power supply, such as a storage battery, a rectifier supplied by a utility system, or a hand generator.

The alternating current delivered to clock 2 is obtained from the direct current power source 4 by a combination of conventional apparatus 6 here termed an amplifier and translator. A conventional power frequency is impressed on the grid of one stage of the amplifier of this apparatus 6, to the plate and cathode of which the direct current source is connected. The resultant pulsation of the plate circuit is suitably amplified to a transformer included in the translation equipment, whence an alternating current of the power frequency referred to is applied to the clock 2.

The energy manifesting a power frequency is derived from a radio receiver and demodulator 8, the separation of the radio frequency carrier wave from the 60 cycle wave being effected by filtering in a manner well known in the radio electronics art. The 60 cycle modulating wave is generated at a central point by a generator 10 which is continuously kept in operation and is not subject to system failures such as are inherent in public utility power distribution systems. In order to be very certain that the time signals are never interrupted, two entirely separate generators may be coupled in synchronism, so that one may be stopped for repair while the other continues to generate the required signal. The power frequency, as sixty cycles, is impressed on the carrier wave of a radio broadcast transmitter in a well known and conventional manner.

It will be clear from the foregoing that the system is free of hazards such as short circuits which occur in power systems generally and cause an interruption of the power supply. The signal is maintained separately from the power supply, and so long as local power is maintained, the time indication will be maintained in correct state.

While this system is free from certain handicaps of the conventional alternating current time distribution system in that it is geographically more extensive, and available to remote points, it is obviously lacking in the capacity for itself indicating the correct time if, for example, either the local direct current source fails, or if the broadcast signal fails. In either failure, the correct time indication is lost, and must be reset by the user by reference to another standard. The avoidance of the requirement for this resetting is one of the objects of this invention and is accomplished in each of the various pertinent means and methods hereinafter described.

The following descriptions of systems are of modifications designed to automatically reestablish the correct indication of time at a receiving point upon resumption after interruptions of power supplies and/or signallying systems, a feature in common with telecasting. One advantage of such systems is that the indicating means need not be in continuous operation and may be disconnected when not used, and yet may be placed in correctly synchronized operation instantly. Moreover, either the local source of power, or the central signal station may be shut down, without affecting the capacity for correct time indication upon resumption of operation. The source of signals may be duplicated by several stations so that, in the event one goes off the air, another may be promptly substituted, just as in other uses of radio broadcast signals.

A common characteristic of the various methods of time indication hereinafter described is that a common datum is established in each combination of central control or time signal generating apparatus and the time indicating media. This datum takes the form of either mechanical, electromechanical, or electrical ties in such manner that the indicating media automatically indicate the correct time when the system is placed in operation, no settings being required at the time indicating media, or "clock."

The embodiment of Figure 2, in brief, establishes this datum by a generator 201 applying 120 cycle per second modulating frequency imposed on a suitable carrier wave pattern at the central standard time signal broadcasting station and effective on a synchronous motor 202 at the receiving station to cause it to run at a constant speed to position a light passing slit 208 at the twelve o'clock position at the same time as a second hand would pass through the zero position at the control point or station, the control generator 201 being synchronized to always have a certain point of its rotor pass through a position in space in synchronism with the second hand. In Fig. 3 the common datum is illustrated as being supplied by a direct wire connection 354 between the signalling station 301 and the utilizing indicator or "clock" 303. In Fig. 9 the datum is established by a mechanical or electrical linkage; and in other figures further embodiments and methods are illustrated.

Several types of indicating media ("clocks") may be used, any one of which may be automatically synchronized with the sending station. Some of these types will be described in the following.

The indicator of Fig. 2 comprises a synchronous motor 202 driving a shaft 204 carrying a disc 206 provided with a single slit 208. The rate of rotation of the disc is 7200 revolutions per minute, or two rotations per cycle of sixty cycle per second alternating current. A window 210 carries time indicia 212 of conventional arrangement and design adjacent the path of movement of slit 208, and is mounted on a housing 214 having an end closure 216 provided with a shaft passage 218 for shaft 204. A toroidal neon lamp 220 is mounted within the housing 214 behind the slit 208, and means are provided to energize the lamp briefly as the slit passes the point in its circular path corresponding to the correct time. The neon lamp is designed to produce adequately high intensity of illumination for a very short interval of time, preferably measured in microseconds, so that the illumination of the slit occurs only while it passes over a few minutes of arc. The illumination is repeated each time the slit passes the correct point, however, so that due to retentivity of human vision, the slit appears to be continuously illuminated, and continuously moving in accordance with passage of time in the units indicated.

Both the hour of the day and the minute of the hour are indicated by the same slit 208 and lamp 220 in the arrangement of Fig. 2, the voltage wave applied to lamp 220 being of such character that it includes peaks of voltage effective to ignite the lamp in proper synchronism with the positions of the slit 208 to indicate the hour and the minute at each rotation of the slit. To distinguish the hour indication from the minute indication, which is necessary in one manner or another, the illumination for one of these, for example, the hour indication, may be interrupted to produce a visually perceptible flashing. By so doing, one knows that the hour hand is the flashing hand.

The balance of the apparatus employed at the point of use and illustrated in Fig. 2, includes a signal receiving unit, here illustrated as including a radio antenna 222, a receiver comprising audio demodulating apparatus having a first filter and demodulator 223 to select for amplification the signal AFo which signal is composed of a 1000 cycle per second audio frequency wave upon which there has been impressed at the sending station a 120 cycle per second time datum signal by generator 201, having a second filter and demodulator 225 to select for amplification the signals AFm and AFh which are composed respectively of 2000 and 2300 cycle per second waves upon which have been impressed 60 cycle per second modulation in accordance with minute and hour hand phase shifting later to be described. The audio frequencies are selected so that the signals may be conveniently channeled to their utilization apparatuses by filters forming parts of the demodulating apparatuses. Thus the demodulator 225 may include a single filter constructed to pass the 2000 cycle per second and 2300 cycle per second audio waves on to power frequency demodulators PFm and PFh and another filter to pass the 1000 cycle per second audio waves on to the double power-frequency demodulator PFo. As is pointed out elsewhere herein, it is important to distinguish between the invariable or non-time-phase shift quality of the doubled power frequency Fo and the time-phase shift qualities of the signals Fm and Fh. Power amplifiers 224, 226, and 227 are provided for amplifying the signal energies to provide alternating current of sufficient energy to actuate motor 202 and ignite lamp 220 in accordance with the signal received. The details and design of such apparatus is well known to those skilled in the electronic, radio communications, and illuminating arts.

The point-of-use time indicator, or "clock," of Figure 3 is more clearly illustrated in Figures 4 and 5. This indicator is electromechanical in character, being provided with electromagnetic field producing windings and a rotating armature driving a shaft; being in fact, an electric motor of synchronous character, but characterized by the fact that the speed of rotation is subsynchronous in extreme degree as compared to conventional synchronous motors, and further characterized by the facts that the fields of both armature and of the rotor are produced directly by alternating current and that the fields of the rotor and the stator are constant in amplitude but continuously shifting in space direction and that the two fields are continuously aligned. The fields are produced by two different sources of alternating current, but the frequencies of these sources differ, which fact accounts for the rotation of the armature. The rotation of the armature (rotor) is at a speed which is exactly proportional to the difference in the frequencies of the two sources of alternating current. Thus, referring to Figures 4 and 5, when a sine wave of alternating current voltage of 60 cycles per second frequency Fm is applied to the slip-rings 402 a rotating field is produced in the armature which field rotates at 3600 rotations per minute with respect to the armature itself. When a similar wave of voltage of 3599 cycles per minute is applied to the terminals 404 of the stator windings, the resultant field of the stator rotates at 3599 rotations per minute with respect to the stator. The fields of the stator and the rotor line up so that their dissimilar polarities are adjacent. The difference in cycles per minute between the rates of rotation of the rotor in rotations of its field per minute and the same quantity for the stator, is the rate of rotation of the rotor in rotations per minute. Thus, since the difference in the rates of field rotation is one rotation per minute, the rotor rotates at exactly this rate. Thus, an indicator 300, Fig. 3, when attached to a rotor so energized, moves through a complete circle in exactly one minute, and corresponds to the second hand of a clock. It is clear, however, that when the frequency $Fm$ is made 215,999 cycles per hour, the arm 300 rotates once per hour, and when the frequency $Fm$ is 12×60 minus one cycles per half-day, the arm 300 rotates once in twelve hours.

The rotating fields created in the stator 408 and rotor 410 are each provided by a split phase winding formed of two separate magnetizing coil windings mounted rigidly together with their coil planes at right angles to each other. The stator and the rotor may comprise magnetic cores to increase the torque per ampere-turn of the windings. However, where the load is as light as in a clock, air core, or non-magnetic core structure, is adequate with efficient bearings. The separate winding components of each split-phase winding are made and so related that when a single phase voltage is applied to their terminals the currents flowing in one component coil of the winding is displaced in time by ninety electrical degrees from the current which flows in the other component coil of the same winding. Moreover, the impedances of the two coils are made equal so that the ninety degree component currents are equal in magnitude, that is, so that the maximum values of the currents flowing in each component coil are the same in value but they are displaced ninety electrical degrees. In this way the resultant field of a split-phase winding is made to rotate at a uniform rate, and its amplitude is uniform though continuously changing in direction. The split-phase relation so described is conventionally attained by providing inductance $H, h$, in one coil and capacity $C, c$ (a condenser) in the other coil circuit.

The split-phase windings are diagrammatically illustrated in Fig. 5, in which the stator winding has the two terminals 404 to which an alternating current voltage of power frequency $Fo$ is applied, and which comprises a coil component which is inductive in character and a coil component which is capacitive in character. The stator inductive coil component is traced from the terminal $a$ to the beginning of the coil at $b$, whence it is made up of a plurality of turns of insulated copper wire following the general path $bcdeb$ and the last turn is brought out from $e$ to an inductive reactance H which terminates in a junction with a capacitive coil component $i$ and is connected to one of the terminals 404. The field produced by the inductive coil is projected normal to its plane $bcdeb$ defined by its fixed position in space. The stator capacitive coil component is traced from $a$ to $jklmj$, a plurality of turns following this path and the last turn coming out to condenser C the other terminal of which is connected to junction $i$ and thence to terminal 404. The plane of coil $jklmj$ is rigidly fixed at right angles to that of coil $bcdeb$ in the stator frame 408, and the field produced by it is at right angles to the field produced by the inductive coil, and is in quadrature time phase relation therewith.

In a similar way, the rotor winding comprises inductive coil component $nopq$ and capacitive coil component $rstu$ rigidly mounted in planes at right angles to each other, and, with condensers and inductances included, joined together at their ends and connected to slip rings 402 to which alternating current at frequency $Fm$ is applied. As a matter of practice, the inductances and capacitances are adjusted until the shaft exerts uniform torque throughout a rotation, which indicates that the field is uniform and hence the currents in a coil are equal to the current in the other coil of a certain winding.

While the resultant fields remain in coincidence in space and rotate together and the applied frequencies are different, the rotor must rotate with respect to the stator. By interchanging the sources so that $Fo$ is applied to the rotor winding and $Fm$ to the stator winding, the rotation of the rotor is reversed. By changing the frequency $Fm$ the rotational speed is changed and there is a slight variation in the speed from point to point in the angular rotation. However, by designing the condenser to have a variable capacitance to vary in proper relation to the frequency and in relation to the inductance, the instantaneous speed may be made uniform around the axis of rotation at any frequency. Thus a constant torque exists at all rotatory points of the rotor at any frequency for which the condenser may be adjusted to provide the required capacitance. By introducing a continuously variable frequency source coupled with such capacitance, any speed at either direction of rotation may be easily achieved.

In Fig. 3 the indicator 300 is illustrated to indicate one time unit only, as hours. It will be clear that separate motors may be used for the minutes and hours indication, and that any desired arrangement may be employed to effect the concurrent indication of hours and minutes; as well as seconds and weeks if desired. It is pointed out, however, that the same indicator can be used to indicate both hours and minutes, by intermittently switching from the hours signal to the minutes signal, applying the signals successively to the stator. This manner of operation requires only that two sources of signals $Fh$ and $Fm$ as in Fig. 2, be available for application to terminals 331 of motor 30 Fig. 3, and a suitable switch which may itself be controlled by direct drive from rotor 334. Since the power required to rotate the motor shaft is slight, the motor rotor is very light and responds quickly to changes in position called for by successive signals. Therefore the pointer 300, Fig. 3, appears to be in two positions if the changes are made 25 times or more per second. As so arranged the pointer 300 indicates both hours and minutes.

Figure 6:
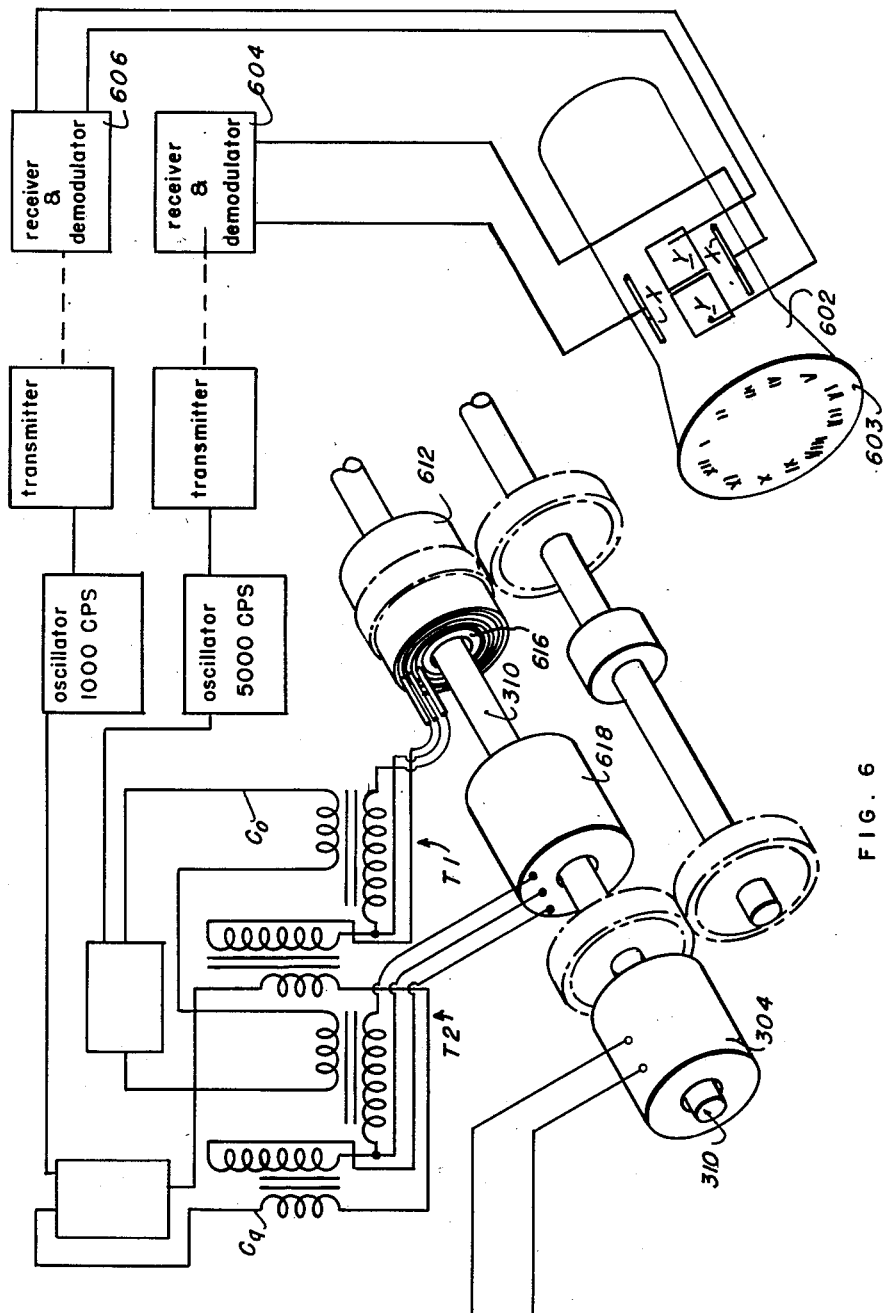
Fig. 6 illustrates diagrammatically, and by wiring diagram and isometric view of rotating machinery, a further embodiment of my invention.

The point-of-use indicator of Fig. 6 illustrates a conventional cathode ray tube employing, for example, electrostatic deflection of the electron beam. The tube 602 includes vertical-axis plate deflection electrodes X and horizontal axis plate deflection electrodes Y. In-phase voltages of sine wave form are applied to the pairs of plates, the maximum magnitudes of these voltages each in itself varying sinusoidally with time, but the maximum values of two voltages being in phase quadrature.

Figure 7:
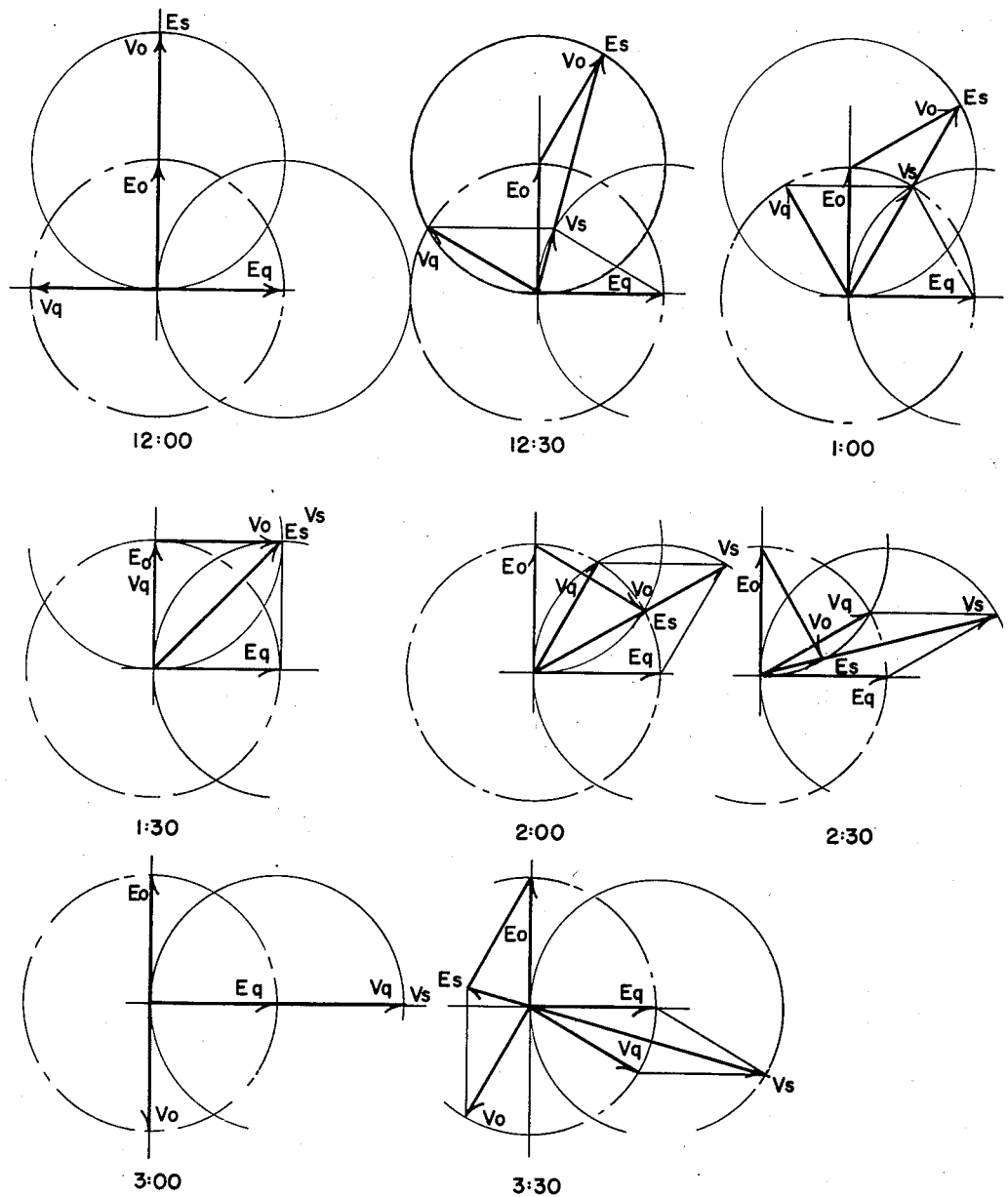
Fig. 7 is a series of vector diagrams illustrative of the voltage relations produced in the apparatus of Fig. 6.

These relationships are indicated in Figure 7. The voltage $Es$ is applied to the vertical electrodes of tube 602 and the voltage $Vs$ is applied to the horizontal electrodes. For indicating hours, these voltages are caused to vary in maximum value from a maximum to zero in three hours. Thus, in Fig. 7, at 12:00 o-clock the voltage $Es$ is a maximum and $Vs$ is zero. They are, therefore, in quadrature relation as to their amplitudes. At 12:00, however, $Es$ is alternating at a fixed frequency of, say, 60 cycles per second. Therefore the electron beam produces a straight vertical trace on the screen indicative of 12:00 o'clock.

At three o'clock the maximum value of Es is zero and that of Vs is a maximum, equal in value to the value of Es at 12:00 o'clock. Vs also alternates at 60 cycles per second. The electron beam, therefore, produces a horizontal trace across the screen of the cathode ray tube indicative of three o'clock.

The sixty cycle waves of Es and Vs are in synchronism, as will be shown. Hence the electron trace is a straight line.

Because Vs maxima equals Es maxima and they are both sine waves, the length of the trace is uniform, and the rate of rotation of the trace about the axis of the cathode ray tube is likewise uniform with time.

Since Es and Vs vary as sine functions and are instantaneously concurrently different in magnitude corresponding to ninety degrees phase relation, their resultant effect is an electrostatic field of alternating sine wave amplitude (constant in amplitude), equal to that produced by the maximum values of either Es or Vs, and this resultant rotates from the twelve o'clock position to the three o'clock position in three hours. This is graphically illustrated in the series of figures showing the direction and path of the trace T of the electron beam on the tube screen, in Figure 7A. Between three and six o'clock, and nine and twelve o'clock, the trace T moves in the second and fourth quadrants; and between twelve and three o'clock and six and nine o'clock, the trace T moves in the first and third quadrants. The face of the cathode ray tube screen is suitably graduated in hours and minutes. If a screen having a large diameter is used, only the hour indication trace is necessary because it can be read with precision to the nearest minute. Each hour division is divided into sixty parts, which means 720 divisions on the hour-minute scale.

The frequency, form, amplitude, and phase of the voltages Es and Vs applied to the tube 602 are determined at the standard time signalling station, and the apparatus and method of generating and transmitting the voltages will be described. At the receiving point the apparatus includes only the apparatus necessary to the energization of the tube 602 and the detection, selection, and amplification of the signal received from the signalling station. For the most part, such local apparatus is of well known and understood character in the electronics and communications arts. In Figure 6 a separate apparatus 604 and 606 is generally indicated for each of Es and Vs in order to receive, demodulate if necessary, and amplify these voltages for application to the tube plates.

Having pointed out various expedients employed at the receiving and utilizing stations of a time system, there now follows a description of various expedients employed for generating signal and/or actuating currents at a central generating station which signals are utilized by the various receiving stations; after which description, reference is made to various methods of communicating such signals and/or actuating currents from the central station to the utilizing stations.

One method of and apparatus for generating time signals or actuating currents is illustrated in Figure 3. This generating apparatus comprises a synchronous motor of conventional design 302 having a stator 304 carrying an alternating current winding and a rotor 306 having a direct current field winding (not shown). As is well known in the electric motor art, when a source 308 of alternating current of constant frequency is applied to the stator 304 a rotating field results and the rotor 306 rotates at the speed of the rotating field with respect to the stator. The speed of the rotor 306 is as constant as the frequency of supply 308; and, if the load driven by the motor shaft 310 remains constant, as in this case it does, a point on the rotor 306 continues to pass the same point on the stator at the exact time that a certain value of instantaneous alternating current is applied to the stator.

The source 308 is a controlled frequency source, such that a continuous application of the designed-for frequency is effected. This type control is available in a great many public utility generating plants at this time. The source and motor may, of course, be of the three-phase type, or any other constant speed type, provided it is properly synchronised with time as will herein appear. This motor is shown directly connected to its various signal generator loads by a common shaft. It will be clear that a geared connection may be used, and if desired for purposes other than time signal generation, as of variable frequency generation, a variable speed drive may be interposed between the motor and the generators.

The various signal generators 312, 314, and 316 are single-phase sine-wave generators having rotor mounted magnetic fields. In the drawing, the speeds of all rotors are identical since they are mounted on the same shaft 310. Since the signal generator loads are unvarying, the poles of the rotors may be regarded as having no relative rotation due to torsional forces. The generators 312, 314, and 316 may be identical in construction. They are electrically conventional in themselves and similar in design, except they are each of the double rotation type; that is, the armature, which corresponds to the stator of a conventional single-phase A. C. generator, is made continuously and continually rotatable, bearings 318 (Fig. 3A) being provided for the frame of the armature on shaft 310.

If it is desired to cause a time hand 300 to make one revolution in twelve hours, one of the generators, as 312 is operated in such a way that it generates one less, or one more, cycle in twelve hours than would be applied to the slip-rings 320, Fig. 3, in the same period of time from source 308. Thus, if the source 308 is of 60 cycle per second alternating current, which is 3600×60×12 cycles in twelve hours, the frequency generated by generator 312 is one less, or more, than this in twelve hours. With sixty cycles A. C. applied to the stator 304 of motor 302, the required increase or decrease of exactly one cycle in twelve hours in generator 314 is achieved by rotating the armature 322 against or with the direction of rotation of the rotor at the rate of exactly one revolution in twelve hours.

The exact loss or gain of frequency is effected directly from the motor shaft 310 through a series of speed reduction gears 324, 326, 328. Thus, supposing shaft 310 to rotate at sixty revolutions per second, then the gearing speed reduction is from 60 revolutions per second to one revolution in twelve hours, or 12×60×60 to 1.

The frequency in cycles per second generated by generator 312 in this case differs from sixty cycles per second by the reciprocal of this value.

Since the rotation per unit of time of the shaft of motor 330 is equal to the difference in the cycles of alternating current applied to its stator winding 332 and its rotor winding 334, in that time, and since sixty cycle current is applied to the rotor for twelve hours and this number less one cycle are applied to the stator, it is clear that the rotation of hand 300 is once in twelve hours, thus taking the character of an hour hand.

In a generally similar manner the generator 314 is caused to generate a frequency of one less (or more) cycles per hour than the number of cycles applied to rotor 334, that is, 216,000 less one. Thus generator 314 generates 215,999 cycles per hour, and this is accomplished by running the armature 333 in the direction of the rotor rotation exactly one rotation in one hour, by gear reductions 326 and 328 geared to shaft 310. By energizing the armature 332 of motor 330 in accordance with the output of generator 314, instead of from generator 312 as shown and previously described, the hand 300 makes one revolution in exactly one hour. Accordingly, when a second motor is provided identical with motor 330, having its rotor energized from 308 and the two motors having their armatures energized respectively by current from generators 312 and 314, their rotors rotate respectively at one revolution in twelve hours, and one revolution in one hour. The essentials of a clock movement are thus fulfilled.

In similar fashion, the generator 316 is caused to generate one less (or more) cycle in one minute than source 308, or 3599 (or 3601) cycles per minute. This is done by the gear reduction unit 328 driven from shaft 310, and a third motor 330 having a shaft carrying a hand 300 is driven to rotate one revolution in one minute, thus indicating seconds and fractions thereof.

The gear reductions are effected in such a manner that the reduction due to unit 328 is effective upon all three generators, 312, 314, and 316 while gear reduction unit 326 is effective upon but the two generators 312 and 314. A one-to-one gear linkage 336 serves to drive shaft 338 and shaft 310, and the reduction of unit 328 is 3600 to one so that in one minute the shaft 340 rotates once to drive 1:1 gear link 342 and rotate the armature 344 of generator 316 precisely once per minute. Gear reduction unit 326 reduces from the rotation of shaft 340 of one revolution per minute to cause shaft 346 to rotate once per hour which, through 1:1 ratio gears 348 drive armature 333 exactly one revolution in one hour. Gear unit 324 reduces from the speed of 346 of one revolution per hour to produce one revolution in twelve hours in shaft 350, which shaft drives 1:1 ratio gears 352 to effect rotation of armature 322 once in twelve hours.

It will be clear to those skilled in the art that various other expedients may be resorted to to positively assure an exact tie between the various generators so that there will be no drifting away from the described relation of the wave trains generated by the various generators. By the arrangement of Fig. 3, attention to prevention of gearing backlash is not a critical requirement since loads are always in the same direction. It will be observed, however, that the smallest unit of time signal generator 316 involves the least gearing, and the accuracy of time indication for the fractions of a minute depends on accuracy in the gearing; that is, rotation of armature 344 must be precisely proportional to the passage of time.

In employing the source 308 to energize the rotor 334 it is assumed that the load on motor 304 is constant. Should this not be the case, and should the load gradually increase on motor 304 over a period of time, the rotor 306 slips in proportion and this slight angular displacement results in an error in time indication at the utilizing station 320. To avoid this difficulty, a fourth single-phase sine wave generator (not shown) is provided, utilizing shaft 310 for its rotor field support and a fixed armature is provided the output of which goes to motor 330 in lieu of the direct supply 308. In this way the datum signal for rotor 334 is rigidly tied in with the time signals effected by generators 312, 314, and 316.

The manner of transmission of the time signal from armature 332, may be by continuous conductors, or by radio communication as indicated in Figure 3. If continuous conductors (wire transmission) is employed, the signals due to the various generators and datum source 8 are thereby maintained in relative physical isolation, although a common return and one wire per signal generator suffices.

When the various signals are broadcast, various channels are provided so that the various signals are adequately isolated and thereby distinguished and non-interferant, as will be described. In Fig. 3 the generator 312 is illustrated as modulating a radio frequency carrier wave for broadcast, the signal being utilized by receiving station apparatus effective upon armature 330. Thus, whether the datum signal is provided by source 308, or by a datum signal generator driven by shaft 310, the datum signal may be broadcast instead of being transmitted over the wires 354.

From the foregoing it is believed to be clear that one set of generators 312, 314, 316, and a datum signal source located at a central point of broadcast, serves a vast number of receiving stations without dependence upon utility power transmission or other wire transmission.

Due to the construction of the motor 330 it does not matter when the two signals applied to the windings are applied. The hand 300 indicates the correct time whenever the transmitted signals are correct. For this reason only one motor 330 is required to indicate hours, minutes, and seconds; because, by switching the armature 320 successively for energization in accordance with the signals 312, 314, and 316, the arm 300 takes successive positions indicating the hour and the minute. The motor is, in this sense, a phase-angle indicator since it indicates the phase displacement between the datum alternating current signal and the time generator signal.

While the generator 312 has been regarded as generating an alternating current wave whose frequency is minutely different from the frequency of the datum signal source 308, it is pointed out that if, at any instant, the armature 322 be regarded as stationary, the frequency generated must be regarded as exactly equal to that of the source 308; although their phase relation is exactly proportional to the time. Regarded in this way, the generators generate frequencies substantially equal in value, but varying in phase angle at uniform rates. This point of view facilitates the understanding of the generator for the cathode-ray tube indicator later to be described.

Other arrangements for generating time signals are illustrated in Figures 9, 9A, 9B, 9C, 10, and 11. A constant speed driving motor 100 is geared to a ferromagnetic shaft 130 to produce one rotation thereof in one minute. This shaft carries 3599 magnetic poles 137 on disc 131, as shown in Fig. 9A, or 3599 black lines equally spaced around its periphery as illustrated at 140 in Fig. 9B. In the case of Fig. 9A, the passage of each pole by a stationary core 141 carrying a winding 143, produces a change of flux therein to effect an alternating current voltage of 3599 cycles per minute in the circuit of the winding. Where 3599 marks are equally spaced around the peripheral edge of disc 131 in Fig. 9B, a photoelectric scanning device 133 is placed to receive reflected light from the disc edge focused thereon by source 135. The marks on the disc produce a change in the light received by the photocell of the scanning device, producing a change in the current flow therethrough. The changes occur at 3599 cycles per minute, and this frequency is suitably amplified and employed as the means of operating the second hand of a clock.

A simple method for producing 3599 equally spaced markings on the edge of a disc consists in the following: Provide a straight band of steel 138, Fig. 11; produce thereon 3600 equal divisions 140 divided by 3600 etched-in marks 139 as shown in Fig. 10; form a circular loop of the band with the end most marks in registry on the exterior periphery thereof; and butt weld the band together so that there appear 3599 marks 139 with 3599 spaces therebetween. A disc 131 having a peripheral diameter of the loop is then provided. The disc is cooled and/or the band is heated and the disc periphery is inserted within the band. The temperature of the assembly is then normalized with the result that the band is tight upon the disc. Accordingly, with each rotation of the disc there is produced 3599 impulses in the photocell of the scanner 133. The production of a 3599 magnetic poles rotor may be similarly effected. The essential difference is that the marks 139 are relatively deep grooves 145 which provide a substantial magnetic reluctance. The band 138 is shrunk onto the rotor core 131 as shown in Fig. 9A which core may be excited by a D. C. field winding 149. An alternating flux results in the stationary core 141 which produces an alternating current in winding 143 effective as a 3599 cycles per minute alternating current.

By proper gear reductions and other similar constructions, the requisite frequency $f_2$ and $f_3$ produced by $(60^3-1)$ poles or marks and $$(12 \times 60^3-1)$$

poles or marks may be obtained from discs 151 and 153; the rotations of shafts 132 and 134 being one revolution per hour and per twelve hours respectively.

In Fig. 9C another arrangement for generating the time signal modulation for a continuous carrier wave with alternate signals is illustrated and is usable with the indicators of Figs. 2, 3, 4, 6, and 9. Only one shaft 130 is provided, which has exactly one revolution in twelve hours. A plurality of discs 151, 153, and 155 are carried by shaft 130. Disc 151 is provided with $(3600-1) \times 12 \times 60$ equally spaced marks, corresponding to 3599 cycles per minute. Disc 153 is provided with $(3600 \times 60-1)12$ equally spaced marks, corresponding to 215,999 cycles per hour. Disc 155 is provided with $(60^3 \times 12-1)$ marks corresponding to that number of cycles per twelve hours.

The light from an electrically heated filament 157 is allowed to fall on the edge surfaces of these discs alternatively and is reflected to a photoelectric cell 159. The filament 157 is housed within a rotatable housing 171 continuously rotated by shaft 163 in conveniently driven relation with shaft 130 as illustrated by link 165. Light from filament 157 is confined to fall on the periphery of disc 151 by the window 152 in the housing 161 and slit 167 in a light barrier 168. Window 152 may be slightly less than 120° in peripheral extent. The housing 161, accordingly, is a light valve. Its rate of rotation is about two rotations per second in order to give the appearance of continuous illumination with the light indicators. Its speed is preferably lower in the case of its use with the mechano-electrical indicators of Figures 2 and 4 to allow the indicators to take a definite position. The beam 170 is reflected to cell 159 whence the signals are impressed on the amplifier and carrier system.

As window 152 passes registry with slit 167, a window 154 of approximately 90 degrees arc, allows a beam of light to fall on the edge of disc 153, whence it is reflected to cell 159 which now, therefore, yields the minutes hand signal. As window 154 passes from registry with slit 167, the window 156 comes into registry with slit 167 and a beam of light now falls only on the periphery of disc 155, whence it is reflected to cell 159 to produce therein an hour-hand signal for impression on the amplifying, modulating, and translating media as elsewhere pointed out herein.

Another mode of generating time signals is embodied in the electronic oscillator illustrated by block-diagram in Fig. 9. Such oscillators having a high degree of constancy of frequency are well known in the electronics art. Each frequency, $f_1$, $f_2$, $f_3$, is the product of a distinct oscillator circuit.

A still further apparatus for generating time signals is illustrated in Figure 6. This apparatus is an outgrowth of the devices and methods of Fig. 3, arising from the requirements of the cathode ray tube indicating device of Fig. 6.

At low frequencies, the electron beam of a cathode ray tube responds instantaneously to changes in the deflecting forces, whether these forces be due to electrical or magnetic fields. Thus, in order to produce an apparently straight-line trace on the tube screen, the direction of the resultant deflecting force acting on the beam must remain substantially the same over a period of time sufficient to activate the luminescent material of the screen in a straight-line path.

In the measurement of phase difference between sine waves of like frequency by means of the cathode ray, or electron beam, tube, it is well known that a straight line results when the two waves are in phase coincidence, and that this line is at an angle of 45° to the deflecting plates when the waves have identical amplitudes. When the phase angle varies from the in-phase condition, however, the trace becomes an ellipse whose minor axis increases progressively with the phase angle increase. I have learned that the straight line trace shifts angularly with a change in ratio of the alternating deflecting forces, their phase-coincidence condition being maintained. In order, therefore, to produce a trace on the cathode ray tube which appears to the observer as a straight line which rotates with time, I employ a method of applying deflecting forces to the cathode ray tube such that the forces are in time phase and of the same frequency, and that their magnitudes vary with time according to a sine wave law.

In Fig. 6, the generator 616 is arranged to produce $(12 \times 60^3 - 1)$ cycles per 12 hours and generator 618 produces $(12 \times 60^3)$ cycles per 12 hours, both being driven by shaft 310 and motor 304 in a manner similar to the arrangement of Fig. 3. The armatures of the generators have two-phase windings, each winding having generated therein a sine wave of voltage, the phase relations between the waves of each generator being ninety electrical degrees, and the values of the voltages being equal. Referring to Fig. 7, regard generator 612 as generating quadrature related voltages Vo and Vq and that the datum signal generator 618 generates quadrature related equal sine wave voltages Eo and Eq, where the R. M. S. values of these voltages are also equal, and equal to Vo and Vq.

By initial adjustment of the armature of generator 612, the maximum values of voltages Eo and Vo are made to occur at zero time, that is, at twelve o'clock. Voltages Eq and Vq are then in phase opposition. The outputs of these generators are fed to the primaries of two-phase transformers T1 and T2, and the secondaries of these transformers are so connected that the voltages Eo and Vo add in the circuit Co to produce the resultant Es equals 2Eo; and that Eq and Vq are opposed in a circuit Cq to produce Vs equals zero, all at precisely 12:00 o'clock, as shown in Fig. 7.

Due to the fact that Vo and Vq are changing their respective phase relations with respect to Eo and Eq, the resultant voltages in circuits Co and Cq vary in amplitude and phase angle with respect to their zero time values. As shown by the succession of diagrams in Fig. 7, Es varies sinusoidally in magnitude from a value of Es equals 2Eo to Es equals zero at three o'clock. During this period Vs has increased from Vs equals zero to Vs equals 2Eo. During this period the phase of Vo has changed through one hundred and eighty electrical degrees out of coincidence with Eo. It is evident, therefore, that the armature of generator 612 is constructed to rotate twice during a twelve hour period and that the generated cycles is two cycles greater (or less) than the cycles generated by generator 304.

It is also evident that, between twelve and three o'clock the amplitudes of Es and Vs have varied with time sinusoidally between a maximum and zero, passing through one quarter of one cycle of a sine wave having a twelve hour period, and that the progress of time and the generators causes the completion of the cycle according to harmonic law, in twelve hours.

The frequencies of the voltages Es and Vs are exactly equal and the maxima of one are in phase with the minima of the other and they are both sine waves, of precisely the same frequency. The frequencies are an average of the two frequencies of the two generators, but may, for some purpose, be regarded as substantially sixty cycles per second, the same as generator 312 generates. For these reasons, upon applying Es to the plates X—X, and Vs to plates Y—Y of tube 602, the trace produced on the screen 603 is a straight line. This is diagrammatically illustrated in Fig. 7a wherein the concurrent relative instantaneous values of Es and Vs are plotted vectorially for each half-hour of the twelve-o'clock to three o'clock interval. It will be observed that, at twelve o'clock the trace must be vertical because Es only then has value. At 12:30 the voltages have both changed in value. Trace T is shown by dotted lines to be straight. This is so because, as shown in Fig. 7, the voltages are in phase.

It will be observed that the vector sum (T) of Es and Vs is a constant, and that angularity with respect to a vertical line is proportional to time in the linear sense. Therefore, it is apparent that the trace T rotates in synchronism with time. Furthermore it is evident that the position of trace T is a direct indication of one-half the value of the phase angle between Eo and Vo. The principle is therefore employable to indicate phase angle accurately and without calculation. Since the straightness of the trace indicates trueness of the sine waves, the apparatus can be used to test sine wave generators for purity of sine wave.

It will be clear that the voltages Es and Vs may be readily transmitted by any system of transmission. As illustrated in Fig. 6 by block diagram the outputs of circuits Co and Cq are caused to modulate carrier frequencies of 10,000 and 5,000 cycles per second. Since these two carrier frequencies are readily separated at a receiving station by suitable filters, they may be concurrently impressed on a radio frequency channel for transmission through space, and separated at the receiving station. For simplicity the carriers are shown as separately channeled to receiver demodulator, and power amplifier units 604 and 606, whence the signal is applied to the tube 602.

It should be observed that this method of generating requires the transmission of but two voltage wave signals Es and Vs. The position of zero of time is fixed on the screen 603 by the plates X—X to which the voltage Es is applied, and so long as the generating apparatus functions correctly, the tube 603 is furnished a correct signal. It is further to be observed that only fixed frequencies are involved at 604 and 606. Hence all elements can be designed for this factor as a constant. Tube 602 can be placed in operation at will to indicate the time and shut down when not in use, to preserve the life of the tube.

As described, the tube 602 provides but one indication, that of hours. The hours indication is precise however, and serves to indicate any fraction of an hour with the same trace. If the diameter of the tube screen be of the order of one foot, the value of one minute of time is represented by an arc of .05 inch approximately.

It is clear, however, that a further generator may be provided to give a minute signal. To simplify the utilizing apparatus, the trace for hours indication may be alternated with the trace for minutes so that the same tube may be used as previously described. The only modification required is that the output of the minutes generator (which is similar to 612, but loses two cycles per hour rather than two cycles per twelve hours as does 612) shall be periodically alternated with the output of 612 by means of a drum switch (not shown) at the generating station. If the changeover be of sufficient frequency, the appearance of the screen includes two straight line traces, one for hours and the other for minutes. However, if the arrangement is made such that the hours indication is of substantial duration, but interrupted to cause an apparent flicker, and the minutes indication is made to appear continuous, one can easily distinguish the two for identification of the hours indication and the minutes indication.

The waves Es and Vs can be employed to control the position of a mechanical pointer. Two coils are fixed at right angles to each other and produce a resultant field of magnetism, the field due to one coil being forced by Es applied to the coil and the field of the other coil being forced by Vs applied to the coil. An iron vane will, if mounted with its axis at right angles to the one center of the fields of the coils, rotate in accordance with time, as will be understood from the foregoing.

Various methods of transmitting the time signals are available. In Fig. 2 all signals are carried on one radio frequency broadcast carrier. The modulation comprises so-called isolating subcarriers of 1000, 2000, and 2300 cycles respectively. The 1000 cycle wave is modulated by a voltage of the 120 cycle per second frequency which is the datum frequency. The datum frequency is selected by the demodulator PFo from the received signal and applied to run synchronous motor 202 in exact phase relation to the generator at the broadcast station. The 2000 and 2300 cycle waves are modulated by the hour and the minute time signals respectively of frequencies Fh and Fm and are selected from the received signal at AF and separated from each other at PFm and PFh and applied to the flashing lamp 220. Both the hours and the minutes signals are utilized in the same lamp 220 but they are separated for transmission to provide for their distinct effects on lamp 220.

In Fig. 12 a separate radio frequency channel is shown as being provided for each signal and the receiver has a separate tuning for each carrier channel whereby the correct signal only is applied to the proper section of the utilizing apparatus. Four channels provided cover the datum signal 60 (or 120) cycles per second and the cycles per minute, per hour, and per 12 hours, requisite for indicating the time of day to the nearest second.

In Fig. 13 each of the signals is applied to modulate isolating audio carrier waves which are all impressed on a single radio-frequency broadcast carrier. In this way broadcast spectrum is conserved.

The time signal utilizing apparatus, or clock, of Figures 8 and 9, comprises a synchronous motor 100 driven by an alternating current of datum frequency $f$, as 60 cycles per second current from a time frequency controlled public utility system, or from the source 308 in Fig. 3. The shaft of the motor 100 carries a disc 102 provided with three radially displaced slits 106, 108, 110. Fixed with respect to the stator of motor 100 is a housing 112 providing therein annular channels 122, 124, and 126 opening toward the disc 102 and in registration respectively with the slits 106, 108, and 110 through the path of rotation of the slits so as to be capable of passing light through said slits at all positions thereof. Mounted in the channels are a plurality of neon glow lamps. These lamps have the characteristic whereby when a certain value of voltage is applied they are illuminated, and when the voltage drops below a certain value the lamps are extinguished. Accordingly, when alternating current is applied to these lamps they flash twice per cycle. The lamp electrodes are so arranged that only one flash per cycle issues from the channel.

Voltage, of precisely regulated value, is applied to all the lamps in channel 122 at frequency $f_1$, or 3599 cycles per minute, while 60 cycles per second cause motor 100 to rotate at 3600 revolutions per minute. The slit 106 therefore appears to rotate once per minute, although it actually rotates 3600 times per minute. A seconds scale is provided on the periphery of frame 112, or on the window pane 120.

The lamps 116 in channel 124 are illuminated by alternating current of frequency $f_2$ of $60^3-1$ cycles per hour, and produce an appearance of rotation of slit 108 of one rotation per hour, which corresponds to the minute hand of a clock.

The lamps 118 are illuminated by alternating current of frequency $f_3$ equal to $(60^3 \times 12-1)$ cycles per 12 hours, to cause an apparent rotation of the slit 110 of one rotation in twelve hours, although the slit actually rotates $12 \times 60^3$ times per twelve hours. Instead of lamps 114, 116, or 118, any lamp having a high intensity low duration flash resulting from the frequencies applied may be employed. It is to be noted that the shafts 138, etc., are, in the modification of Fig. 9, driven by the same shaft as disc 102, thus establishing the datum frequency as the frequency which characterizes the voltage applied to motor 100.

The various slits 106, 108, and 110, are shown as arrows, and the minutes and seconds arrows are directed outwardly to cooperate with scales of minutes and seconds, which are one and the same, while the hour slit 110 is directed inwardly to indicate the hours in reference to the scale shown. It will be obvious to those skilled in the art that other arrangements of the clock may be resorted to without departing from the spirit of the invention.

Various features of the invention will, evidently, find use for purposes other than clock systems. Several uses will be pointed out with respect to certain of the features. Other uses will become apparent to persons skilled in the various arts to which the features may be applied.

The slow-speed motor of Figure 4, for example, may be utilized as a variable speed, slow-speed motor, simply by varying the frequency applied to one of the split-phase windings. By providing a variable frequency source, any frequency of which may be obtained continuously over a period of time, a wide range of fixed speeds may be provided for. Moreover, a condenser C and inductance H of Fig. 5 may be so chosen that the current flowing is a maximum at a certain frequency; that is, so that resonance occurs. Under this condition, a maximum effect is secured from one frequency component of the power applied at 304. Accordingly, if several component frequencies are included in the wave applied at 304, as for example, if the wave be a square wave shape, the speed of the motor may be varied by varying the resonant frequency, which may be varied by changing the value of the capacitance of condenser C.

The association of a plurality of generators having fixed phase relationships between the frequencies generated thereby such that the gain of one voltage wave with respect to another is constant in respect to the cycles per second, suggests many possible uses, as for example, where it is desired to cause two synchronous motors to run with an ever widening relative angular displacement, changing in angle at a constant rate.

A synchronous motor receiving energy from generator 322 loses speed at a constant rate with respect to a motor of the same kind receiving energy from the generator 314. While it is true that the speed loss is very minute in the case of clock movements, it is clear that any desired speed differential of constant value may be provided by selecting the proper gear relationships, for gears 326 and 324, for example.

The practice of gearing synchronous motors so that two different mechanisms driven by separate synchronous motors, may have fixed speed relationships does not necessarily require that the mechanisms shall, at any particular time, have a particular mechanical relationship. Even though they be energized at the same time by the closure of a switch energizing both concurrently, it is probable that the changing load conditions of the mechanisms results in the loss of one or more revolutions in the various motors with respect to the alternating current applied. The losses vary with the various loads. One motor may take a hundred cycles to reach synchronous speed while another may take only 90 cycles. In order to restore the condition desired in such mechanisms it is advantageous to provide a differential gear to replace a gear box such as 328. The relative positions of the generator armatures 304 and 344 may then be adjusted through the pinion gear of the differential gearing so that the lost cycles may be regained by the slow motor after it has come up to synchronous speed, or while it is coming up to speed. By the pinion gear is meant that gear which corresponds to the pinion of the main drive shaft of a conventional motor vehicle, which drives the two gears for the right and left rear wheels of such vehicle. The shaft 338 corresponds to the vehicle shaft connected to the left rear wheel and the shaft 340 corresponds to the shaft connected to the right rear wheel of such vehicle. The drive through the pinion through which adjustment of the phase angle of the two motors driven by the two generators is secured may be a manual drive, or may itself be a motor drive. This drive may be made automatic so that no net cycles are lost, by attaching the pinion for drive by a motor such as that of Fig. 4, where the shaft thereof drives the pinion and the energy of frequency $F_o$ is supplied by generator 304 and the energy at $F_m$ is supplied at generator 316, the direction of rotation of the pinion being chosen so that the motor 330 tends to come to a stop due to equalization of $F_o$ and $F_m$.

The foregoing application of motor 330, which is more clearly described and illustrated with respect to Fig. 4, suggests its use as a frequency gain or loss indicator. If, for example, $F_o$ be a standard frequency, such as might be supplied by a system frequency standard, or a tuning fork generator, then when $F_m$ is supplied by an alternator the frequency of which is to be regulated or compared, it is clear that the indicator arm 300 rotates once per cycle of gain or loss of the alternator cycles output with respect to the standard. It in fact will integrate the gain-or-loss cycles over a period of time, since it rotates in one direction with a gain, and in the opposite direction with a loss of cycles by the alternator. A two-way counter connected to the shaft of the motor will indicate the net gain or loss of cycles. If, however, control is desired, the arm 300 may operate between, or, on, a suitable control apparatus to effect the synchronising of the two generators supplying its windings.

In another use of the apparatus of Fig. 2, the time scale and window of the indicator unit may be removed. A photo-electric scanner placed to receive light through the slit 208 at the twelve o'clock position, will receive such light at each rotation of slit 208 through that position. If another scanner be placed opposite the three o'clock position, for example, and arranged to receive light passing through slit 208 from lamp 220, it will receive light at each rotation of disc 206. Such arrangements result in the provision of light impulses to the scanners spaced by, for example, three hour or nine hour intervals. Since the impulse of light on the cell of a scanner results in a usable change in the current flow therethrough, and such impulses may be used to initiate or terminate industrial processing operations, it is clear to those skilled in the timer and process timing arts that the clock of applicant's invention may be readily applied for precision timing of industrial processes. When the flashing of lamp 220 results only in the indication of hours through slit 208, the slit rotates several times while light is available to a particular scanning head position, depending upon the aperture width in the direction of rotation through which light passes from 220 to the cell of the scanner. Several flashes will pass to the cell in time spaced relation. The number of such flashes being great, and the number of such flashes resulting opposite a minutes position, can be used as the means of indicating and/or controlling in accordance with hours and/or minutes. For the flashing operation indicating minutes to pass through a certain arc requires much less time than does the flashing operation for hours indication. Hence, if a cycle counter be caused to count the flashes passing to the cell of a scanner, as by being energized by the output of the scanner, that counter may be set to operate only after a certain number of flashes have occurred; hence it may be set to close a control contact only when the slit 208 passes a certain point in the indication of hours, and because the counter will not operate on less than the number of flashes occurring incident to the hour indication, it will not respond to the passage of the slit when it is indicating minutes or seconds. Such counters are provided with means for automatic resetting to zero upon the cessation of impulses to the operating mechanism. Applicant, in referring to such timing systems does not intend thereby to indicate that such systems are, per se, claimed as his invention by this application, but intends to point out that certain features of this invention are applicable in such systems. Such systems may be claimed in subsequent applications. The apparatus herein particularly described is desired to be protected in its various possible uses and it is for this purpose that such possible uses are mentioned herein.

Referring to Fig. 7A, it will be appreciated that either $E_s$ or $V_s$ used alone on the cathode ray tube, produce a straight line, the length of which is proportional to time.

I claim as my invention:

1. In a time indicating system requiring means for producing alternating current waves having dual periodicity: means for generating a first sine wave of alternating current; means like the first generating means for generating a second sine wave of alternating current at a like order of frequency of alternation as said first sine wave, means for causing the phase relation between said waves to be altered at a uniform rate, and means for combining the effects of said waves to produce a wave having two periodicities.

2. In a time indicating system requiring means for producing an electrostatic energy field such that electrons therein are caused to move in successively sensibly straight paths which progressively change direction in a visually nearly imperceptible fashion comprising: a pair of electrodes juxtaposed to provide a region therebetween within which an energy field is produced by the presence of an electrical potential difference between the electrodes; a similar pair of electrodes geometrically arranged at right angles to said first electrodes; means for applying a voltage to the first pair of electrodes having a high and a low frequency sine wave periodicity; and means for applying a like voltage to the second pair of electrodes in phase with the first voltage as respects the high frequency periods and displaced in time quadrature with respect to the low frequency period.

3. A method of causing the displacement between two members to be represented by the direction of the resultant of two force components which method comprises causing the generation of two phase-displaced sinusoidal voltage waves representative of the position of each member, combining each voltage wave representative of the position of one member with a phase displaced voltage wave representative of the position of the other member to effect a resultant voltage wave of each combination having a dual periodicity, the resultants of the two combinations being in-phase as to one periodicity and in quadrature as to the other periodicity, and combining the effects of said resultants to produce an effect in direction representative of the relative directions of the two members.

4. In a time indicating system, a generating system for generating alternating current waves according to claim 1 so that their combined effects vary periodically in accordance with standard time, and means for indicating time in response to said alternating currents.

5. In a time system, means for generating an alternating current for use as a time signal comprising, in combination: a rotor, a shaft for driving said rotor, means for driving said shaft at a constant rotational speed, a rotatable stator, means for driving said stator in rotation, said driving means being driven from said shaft, the rotor and stator including means for generating and for delivering periodically alternating current whose frequency is a function of the algebraic sum of the speeds of rotation of the stator and the rotor.

6. In combination, means for generating two waves having a double periodicity, in phase as to one periodicity and in quadrature as to another periodicity, means for transmitting said waves; means for causing said waves to jointly produce an energy field having a slow and almost imperceptibly but continuously changing direction; and means for continuously and visually indicating the direction of said energy field responsive to said energy field.

7. In combination: a cathode ray tube having two pairs of deflection plates respectively arranged to deflect the electron beam along perpendicular axes in a plane perpendicular to the normal path of the beam; and means for causing two sine wave voltages to be applied to the respective pairs of plates, said means including two two-phase sine wave voltage generators the two voltages in each of which are generated in phase quadrature relation, said generators including rotating fields and common means for driving both of said rotating fields in synchronism, the armature winding of one of said generators being rotatable with respect to the armature winding of the other generator, means for rotating the said one armature winding with respect to the other armature winding while both generators are generating voltage, means for causing voltages proportional to the sum or difference of two of the voltages generated by the two generators to be applied across one pair of deflection plates of the tube, and means for causing voltages proportional to the sum or difference of the other two voltages generated by the two generators to be applied to the other pair of deflection plates.

8. In combination: an electron beam tube having two deflection devices respectively arranged to deflect the electron beam along perpendicular axes in a plane perpendicular to the normal path of the beam; and means for causing two sine wave voltages to be applied to the respective devices, said means including two two-phase sine wave voltage generators the two voltages in each of which are generated in a phase quadrature relation, said generators including rotating fields and common means for driving both of said rotating fields in synchronism, the armature winding of one of said generators being rotatable with respect to the armature winding of the other generator, means for rotating the said one armature winding with respect to the other armature winding while both generators are generating voltage, means for causing voltages proportional to the sum or the difference of two of the voltages generated by the two generators to be applied on one of the deflection devices, and means for causing voltages proportional to the sum or difference of the other two voltages generated by the two generators to be applied to the other deflection device.

9. In combination: an electron beam tube having two deflection devices arranged to deflect the electron beam along perpendicular axes in a plane perpendicular to the normal path of the beam; and means for causing two sine wave voltages to be applied to the respective deflection devices, said means including two two-phase sine wave voltage generators for generating equal voltages the two voltages in each of which generators are equal and are generated in phase quadrature relation, said generators including relatively rotating fields and armatures, one of the windings of one of said generators being rotatable with respect to the corresponding winding of the other generator, means for rotating the said one winding with respect to the said other corresponding winding while both generators are generating voltage, means for causing voltages proportional to the sum or difference of two of the voltages generated by the two generators to be applied on one of the deflection devices, and means for causing voltages proportional to the sum or difference of the other two voltages generated by the two generators to be applied to the other deflection device.

10. In combination: an electron beam tube having two deflection devices arranged to deflect the electron beam along perpendicular axes in a plane perpendicular to the normal path of the beam; and means for causing two sine wave voltages to be applied to the respective deflection devices, said means including two two-phase sine wave voltage generators adapted to generate equal voltages the two voltages in each of which generators are equal and are generated in phase quadrature relation, said generators including relatively rotating fields and armatures, one of the windings of one of said generators being rotatable with respect to the corresponding winding of the other generator, means for rotating the said one winding with respect to the said other corresponding winding while both generators are generating voltage to change the phase relationship between the generators, means for causing voltages proportional to the sum or the difference of two of the voltages generated by the two generators to be applied on one of the deflection devices, and means for causing voltages proportional to the sum or the difference of the other two voltages generated by the two generators to be applied to the other deflection device, both of said last mentioned two means including induction devices, each induction device having a primary winding energized by one phase of the two generators and the secondary windings of two such induction devices being connected together to transmit energy from both of said primary windings.

11. In combination: an indicating device providing indicating means; and movable devices for causing said indicating means to indicate their movement, said devices including a plurality of alternating current generators, synchronous means for driving said alternating current generators in synchronism, a winding of one of said generators being movable relative to the corresponding winding of the other generator while the generators are generating voltage, means for relatively moving said windings while voltage is being generated, and means for transmitting energy proportional to the voltages of said generators to the said indicating device, and means responsive to said voltages for causing the indicating means to indicate the relative movement.

12. In combination, a shaft, a plurality of magnetic field windings on said shaft, a plurality of armature windings associated with said field windings for having voltage generated therein upon rotation of said shaft, one of said armature windings being rotatable with respect to the other armature winding, and means connecting the shaft to drive said one armature winding.

13. In a time indicating system requiring means for producing alternating current waves having dual periodicity; first and second means for generating separately two sine waves of voltage, means connecting said generating means in circuit so that their voltages are algebraically additive, and means for causing the time phase relationship between the two sine waves to be varied at a uniform rate.

ERVIN G. JOHNSON.

References Cited in the file of this patent

UNITED STATES PATENTS

| Number | Name | Date |
| --- | --- | --- |
| 1,921,982 | Wittkuhns | Aug. 8, 1933 |
| 1,933,650 | Basom | Nov. 7, 1933 |
| 2,005,158 | Nilson | June 18, 1935 |
| 2,114,500 | Nilson | Apr. 19, 1938 |
| 2,137,738 | Faubion | Nov. 22, 1938 |
| 2,188,145 | Frantz | Jan. 23, 1940 |
| 2,236,374 | Marrison | Mar. 25, 1941 |
| 2,256,487 | Mosely | Sept. 23, 1941 |
| 2,313,966 | Poch | Mar. 16, 1943 |
| 2,363,941 | Busignies | Nov. 28, 1944 |
| 2,378,383 | Arndt | June 19, 1945 |
| 2,406,858 | Shepherd et al. | Sept. 3, 1946 |
| 2,419,550 | Hardy | Apr. 29, 1947 |
| 2,442,997 | Cooper et al. | June 8, 1948 |
| 2,462,117 | Mikkelson et al. | Feb. 22, 1949 |
| 2,490,891 | Walton | Dec. 13, 1949 |